H. B. NICHOLS & G. M. RICHARDSON.
BRAKE SHOE.
APPLICATION FILED OCT. 14, 1914.
1,177,440.
Patented Mar. 28, 1916.
3 SHEETS—SHEET 1.
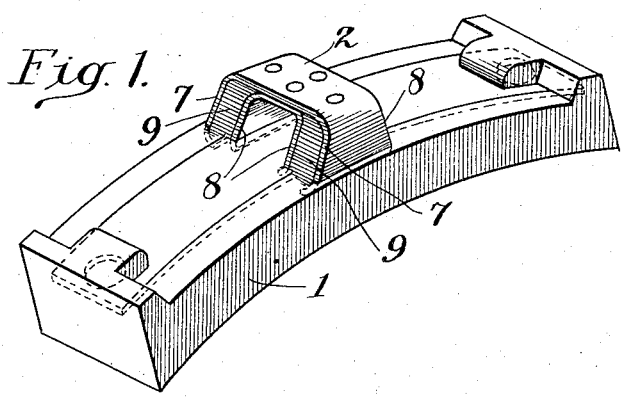
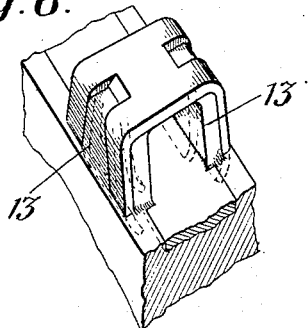
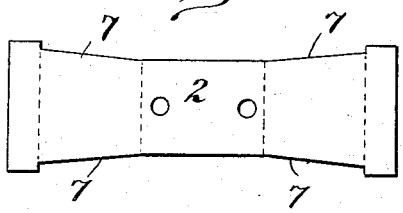
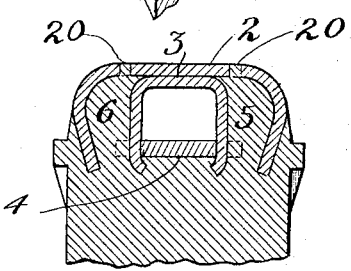
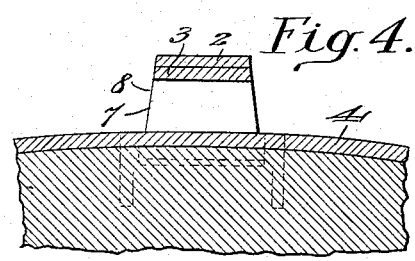
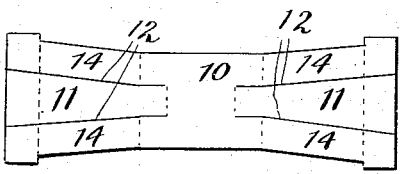

H. B. NICHOLS & G. M. RICHARDSON.
BRAKE SHOE.
APPLICATION FILED OCT. 14, 1914.
1,177,440.
Patented Mar. 28, 1916.
3 SHEETS—SHEET 2.
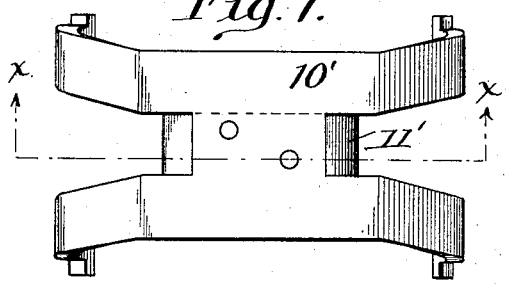
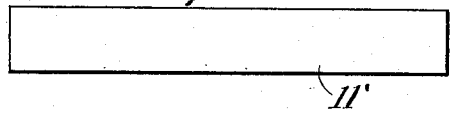
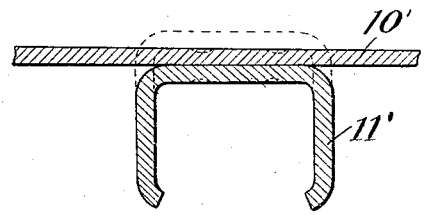
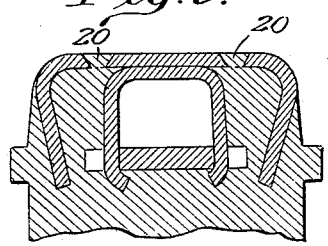
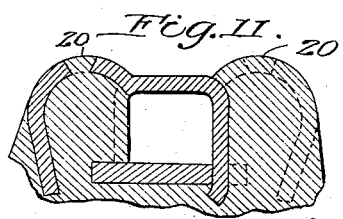
Witnesses
H. Löwenstein
G. E. Ruff
Inventors
Henry B. Nichols
George M. Richardson
By Edward E. Clement
Attorney H. B. NICHOLS & G. M. RICHARDSON.
BRAKE SHOE.
APPLICATION FILED OCT. 14, 1914.
1,177,440.
Patented Mar. 28, 1916.
3 SHEETS—SHEET 3.
Fig. 12.
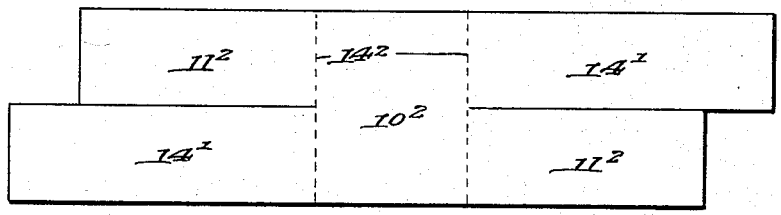
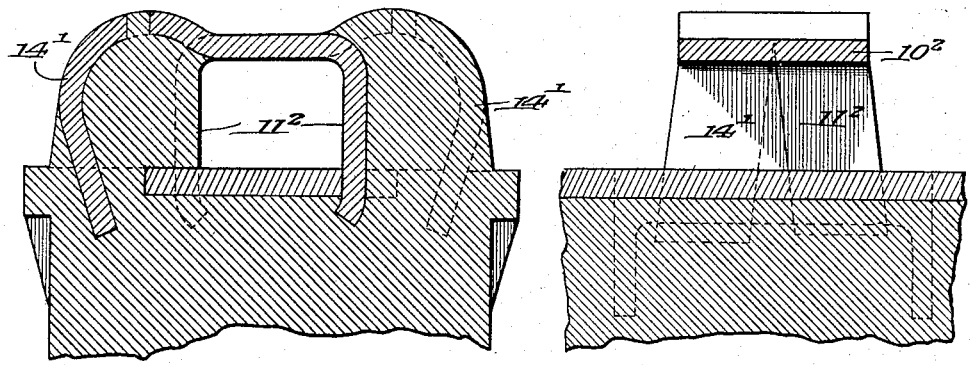
Fig. 14.                    Fig. 15.
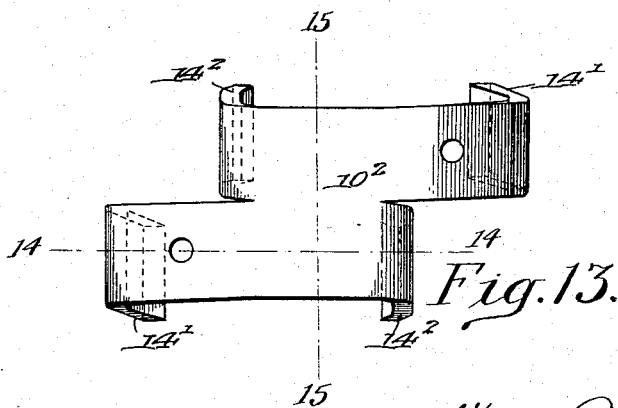
Fig. 13.
Witnesses
H. Löwenstein
G. E. Ruff
Inventors
Henry B. Nichols
George M. Richardson
By Edward E. Clement
Attorney

UNITED STATES PATENT OFFICE.

HENRY B. NICHOLS AND GEORGE M. RICHARDSON, OF PHILADELPHIA, PENNSYLVANIA.

BRAKE-SHOE.

1,177,440.  Specification of Letters Patent.  Patented Mar. 28, 1916.

Application filed October 14, 1914. Serial No. 866,677.

*To all whom it may concern:*

Be it known that we, HENRY B. NICHOLS and GEORGE M. RICHARDSON, citizens of the United States, residing at Philadelphia, in the county of Philadelphia and State of Pennsylvania, have invented certain new and useful Improvements in Brake-Shoes, of which the following is a specification, reference being had therein to the accompanying drawing.

Our invention relates to vehicle brakes, and is applicable to railway cars, motor cars of other types, wagons, and other wheeled vehicles.

It has for its object the provision of a brake shoe which will be efficient, durable, and simple to manufacture.

The present invention is in the nature of an improvement over our previous invention for which Letters Patent of the United States have been granted us under date of September 22, 1914, No. 1,111,606.

In the specification of our patent we have described a shoe composed of cast iron, with a lug of ductile or wrought iron or steel partially embedded in the body in casting. The lug is formed of interior and exterior arches between which the cast metal rises and constitutes a filler with inclined bearing faces projecting oppositely toward the ends of the shoe, beyond the edges of the ductile metal. These faces take the thrust and wear of contact with the holding socket when braking.

According to our present improvement, we provide composite bearing faces, by forming the ductile or malleable iron lug with inclined edges, and then causing the cast metal filler to form inclined faces in the same planes with said edges. We find that in practice this arrangement gives excellent results, and as we believe we are the first to make composite flat bearing surfaces of this kind, formed by straight or tapered edges of the yoke and a facing of the body metal of the shoe, we shall claim the same both broadly and specifically.

In addition to the foregoing, other features of improvement will sufficiently appear from the detailed description hereinafter.

Our invention is illustrated in the accompanying drawings in which—

Figure 1 is a perspective view of a brake shoe with our improved lug. Fig. 2 is a plan or development of a blank for the form of lug shown in Fig. 1. Fig. 3 is a transverse section of the shoe showing the malleable or ductile metal lug in place. Fig. 4 is a longitudinal section of a portion of the shoe showing the same. Fig. 5 is a plan view of a modified form of blank adapted to form both the inner and outer arches of one piece. Fig. 6 is a perspective view of the lug formed up therefrom. Fig. 7 is a plan view of a further modification, in which the inner arch shown in Fig. 6 is made separate from the outer arch. Fig. 8 is a plan view of the separate tongue of Fig. 7. Fig. 9 is a cross-sectional view on the line $x-x$ of Fig. 7 showing the method of attaching the same. Fig. 10 is a sectional view showing the upper part of the lug of Fig. 3, with dovetailed locks through openings in the malleable metal. Fig. 11 is a similar view showing the upper part of the lug of Fig. 14 with similar locks. Fig. 12 is a plan view of a blank constituting a still further modification of arch and fittings, in which the tongues on opposite sides are of unequal length. Fig. 13 is a plan view of the double arch formed up from the blank of Fig. 12. Fig. 14 is a sectional view of the back of the shoe, showing the arch in section on the line 14—14 of Fig. 13. Fig. 15 is a longitudinal section through the back of the shoe showing the arch in section in the line 15—15 of Fig. 13.

Referring to the drawings and especially to Figs. 1 to 4 inclusive, 1 indicates the body of the shoe, which may or may not have a malleable backing strip as described in our patent. Bridged across the middle of the back of this shoe is a lug 2 formed of parts shown in detail in Figs. 2, 3 and 4. To make this lug, we take strips of ductile metal that are slightly wider than the design shown in the drawings attached to our said patent, and shear the same to the proper dimensions, as illustrated in Fig. 2. After shearing, the lug is formed up as shown in Fig. 3, its outline being substantially that of a very broad horseshoe. Inside this horseshoe or arch, we secure a second arch 3, preferably by spot-welding. If a malleable back or inset is provided for the shoe, it is arranged as shown at 4, the ends of the inner arch 3 embracing it, and preferably lying within slots formed in its sides.

The parts thus shown in Fig. 3, are secured in the mold and the body of the shoe is cast upon them, the cast metal flowing up and filling the spaces 5 and 6 between the inner and outer arches, and the mold being so formed that the faces of the cast metal projections thus formed in the spaces 5 and 6 will be flush with the opposite inclined edges 7 and 8 of the lug arches 2 and 3. This is best shown in Fig. 4, in which the viewpoint is supposed to be taken at right angles to that of Fig. 3. It is also shown very clearly in Fig. 1, where the inclined faces of the cast metal fillers appear at 9—9. The opposite faces are supposed to be the same. Thus it will be perceived that each complete bearing face of the lug is made up of a portion of cast metal inclosed within an edging of mild or ductile metal.

Referring to Figs. 5 and 6, we have therein shown a modified construction of the lug, whereby the inner and outer arches are formed integral. In manufacturing this form of lug, we take a strip of ductile metal 10, shape the same to proper dimensions and at the same operation cut along the lines 12—12, so as to leave tongues 11—11 attached to the body 10. Subsequently the strip is placed in a die, pressed down and shaped, the strips 11—11 being bent in to M. C. B. dimensions covering inside measurement of the key lug, or to such other dimensions as may be required by use to which the brake shoe is to be put. This produces the lug shown in Fig. 6, and when this is cast in the body of Fig. 1, the cast metal 13 flows up around the outside of the members 11—11, and also fills the inside of the outer arch members 14—14, flush with their edges, producing a similar composite bearing face to those shown in the preceding figures.

In Figs. 7, 8 and 9 we illustrate a modified form of the lug in Figs. 5 and 6. In this case the members 11' are made separately in the form of a strip, shown in Fig. 8, and this strip is then secured to the body 10' as shown in Figs. 7 and 9. In so securing it, we preferably use spot-welds, and locate the arch 11' inside the body 10'. Obviously we may rivet or otherwise secure the members together as a variant of the spot-welding and we may also vary the location of the arch by passing the strip 11' over the metal of the outer arch and down through the side slots, as shown in dotted lines in Fig. 9.

In Figs. 12 to 15 inclusive we illustrate a further modified form of lug in which the tongues on opposite sides are of unequal length. As shown in Fig. 12 the body $10^2$ has two opposite long tongues 14' and two alternate short tongues $11^2$. These are bent down on the dotted lines $14^2$, as best shown in Fig. 13. so as to form two arches symmetrically disposed but oppositely displaced. The outside members 14' form the outside arch of the lug. This will be fully understood after study of Figs. 13, 14 and 15. The casting is done as before, and makes a solid lug with composite bearing surfaces to take the thrust and strain due to braking. The body 10' has long tongues 14' and shorter tongues $14^2$.

It will be apparent after reading this description, that other changes and modifications may be made, beside those we have described, as well as divers combinations of the separate features therein presented. We wish it understood that we contemplate all non-essential changes and modifications as within the scope of our invention, the characteristic feature of which is production of a composite bearing face 7—8—9, for the lug regarded as a whole. We wish it further understood that we may use any form of body and any form of lug suitable for our purpose, without departing from the scope of this invention. Thus, we contemplate the employment of all the forms of lug disclosed in our prior Patent No. 1,111,606, with their ends embedded in the body of the shoe and their interstices or openings filled with the cast metal in casting, so that the surfaces of said metal will lie flush on both sides with the edges of the ductile metal, to form composite bearing surfaces. The lug illustrated in Fig. 8 of the drawings of our patent is particularly adapted to this use.

All the lugs of our Patent No. 1,111,606 may be provided with vents 20 such as herein described and illustrated particularly in Figs. 1, 3 and 10. Our experiments have shown these vents to be of value and we purpose applying them generally in our work. Referring particularly to Fig. 3, a very efficient form of construction is produced by countersinking or reaming out the openings 20 from the upper side so that when the cast metal flows up and fills the opening it will create locking dovetails extending through the ductile metal, as shown in Figs. 10 and 11.

Having thus described our invention, what we claim and desire to secure by Letters Patent is—

1. A brake shoe having a cast metal body, and a lug projecting from the back thereof, composed of a malleable metal strip bent substantially into U-shape, and set transversely of the body, with its ends embedded in the cast metal thereof adjacent to the sides of the body, and the space beneath it opening in the direction of the length of the body, with cast metal extending from the body up within the sides, and flush with both edges thereof on both sides, so as to form composite bearing surfaces on both edges toward the ends of the shoe, to take the thrust and wear of the brake head in braking.

2. A brake shoe having a cast metal body, and a lug composed of two members with inclosed space between them, set across the body so as to bridge the same from side to side with open ends toward the ends thereof, said members having tapered edges and said space being filled in casting with metal integral with the metal of the body flush with said tapered edges, forming a composite bearing surface on each edge of the lug, toward the end of the shoe, to take the thrust and wear of the brake head in braking.

3. A brake shoe having a cast metal body and a lug formed of malleable or ductile metal in the form of an arch set across the body with its longitudinally projecting edges properly shaped to form bearing surfaces to take the thrust of the brake head in braking, said lug having divided members with longitudinal spaces between them, said spaces being filled and the divided members surrounded by cast metal forming extensions of the body of the shoe in casting.

4. A brake shoe having a cast metal body and a lug composed of a malleable or ductile metal strip cut lengthwise to form each end into three tongues, the middle tongues bent down to form an inner arch and the outer tongues bent to form outer arches, said lug having its ends embedded in the body of the shoe in casting, and the cast metal flowing up to fill the spaces between the tongues flush with the inner face of the inner tongue and flush with the edges on both sides of the outer tongues.

5. A brake shoe having a cast metal body and a lug composed of a strip of ductile metal forming a bridge across the body with its ends embedded in the body in casting, adjacent to the sides thereof and its edges turned longitudinally toward the ends of the body, metal integral with the body cast inside of the lug flush with both longitudinal edges thereof forming composite bearing surfaces to take the thrust and wear of the brake head in braking.

6. A brake shoe having a cast metal body and a single lug formed from a single tapered strip of ductile metal bridged across the body with its edges projecting longitudinally thereof with its ends embedded in the body in casting, and with composite longitudinal bearing surfaces formed partly by the taper edges of the ductile member and partly by the cast metal filler, to take the thrust and wear of the brake head in braking.

7. A brake shoe having a cast metal body and a lug formed from a strip of ductile metal transversely bridged across the body with its opposite limbs split and spread apart to produce an opposite taper from its center toward the ends of the shoe, the ends of the strip being embedded in the body in casting, and the cast metal at the same time flowing up and filling the spaces between the limbs and within the strip around the key space, and extending flush with the taper edges thereof, so as to form composite longitudinal bearing surfaces to take the thrust and wear of the brake head in braking.

8. A brake shoe having a cast metal body and a ductile metal lug, said lug being formed of a one-piece blank cut both ways from the middle, and the ends bent over to form two arches connected at their crown.

In testimony whereof we affix our signatures in presence of two witnesses.

HENRY B. NICHOLS.
GEORGE M. RICHARDSON.

Witnesses:
AUGUST F. GRUBER,
H. TIEFENBACH.

Copies of this patent may be obtained for five cents each, by addressing the "Commissioner of Patents, Washington, D. C."